(12) United States Patent
Kwok

(10) Patent No.: US 10,621,805 B1
(45) Date of Patent: Apr. 14, 2020

(54) METHOD AND SYSTEM FOR DETECTING CURRENCY

(71) Applicant: Gary Ka Wo Kwok, Kailua, HI (US)

(72) Inventor: Gary Ka Wo Kwok, Kailua, HI (US)

( * ) Notice: Subject to any disclaimer, the term of this patent is extended or adjusted under 35 U.S.C. 154(b) by 0 days.

(21) Appl. No.: 16/170,066

(22) Filed: Oct. 25, 2018

(51) Int. Cl.
  *G07D 7/121* (2016.01)
  *G01N 21/64* (2006.01)

(52) U.S. Cl.
  CPC ......... *G07D 7/121* (2013.01); *G01N 21/6456* (2013.01)

(58) Field of Classification Search
  CPC ....... G07D 7/121; G07D 7/12; G01N 21/6456
  See application file for complete search history.

(56) References Cited

U.S. PATENT DOCUMENTS

| | | | | |
|---|---|---|---|---|
| 6,373,965 B1 * | 4/2002 | Liang | ..................... | B41M 3/144 382/112 |
| 2001/0014169 A1 * | 8/2001 | Liang | ................... | G06K 9/2018 382/135 |
| 2002/0163633 A1 * | 11/2002 | Cohen | ..................... | G07D 7/128 356/71 |
| 2003/0107004 A1 * | 6/2003 | Leach | ...................... | G07D 7/12 250/372 |
| 2008/0063252 A1 * | 3/2008 | Dobbs | .................... | G07D 7/121 382/137 |
| 2012/0257189 A1 * | 10/2012 | Haas | ........................ | G07D 7/12 356/51 |
| 2016/0335826 A1 * | 11/2016 | Sano | ......................... | F21S 2/00 |
| 2018/0165906 A1 * | 6/2018 | Phillips | .................... | G07D 7/00 |

* cited by examiner

*Primary Examiner* — Yara B Green
(74) *Attorney, Agent, or Firm* — W&K IP

(57) ABSTRACT

A method and system for detecting currency, relates to banknote detectors, to solve the problem of accuracy rate causes the banknote detectors can not be used. The system includes a UV light source, a white light source, an image acquiring device, a controller, and a prompting device. The white light source and the UV light source are faced to each other. A currency detecting channel is formed between the white light source and the UV light source. A micro-switch and a pause switch are located on a controlling loop of the UV light source. A trigger of the micro-switch is located in the currency detecting channel. The pause switch and the micro-switch are in series connection. The image acquiring device and the white light source are located at a same side of the currency detecting channel. The image acquiring device outputs a currency image to a display device.

8 Claims, 1 Drawing Sheet

METHOD AND SYSTEM FOR DETECTING CURRENCY

FIELD

The present disclosure generally relates to banknote detectors, and more particularly to a method and system for detecting currency.

BACKGROUND

In related art, although a volume of a banknote detector is small, there are more than ten sensors installed inside the banknote detector. The sensors receive the signals and then connect to the microprocessor to calculate. Most banknote detectors are designed like this on the market, the accuracy and efficiency of the banknote detectors can be effected by old or new currency, or the lack of old currency.

Multiple sensors lead to complex structure. All sensors receive the signals and then transmit the signals to the controller for the following operation. Cooperation of multiple sensors. When one of the sensors goes wrong, the result of checking will be affected, or the banknote detector will be alarmed.

When an operator operates the existing banknote detector, the operator can not judge the authenticity of the banknote by himself, and can only rely on the accuracy of the banknote detector. If the sensors of the banknote detector go wrong, the operator can not continue to use the banknote detector, in the case of a misjudgement of the banknote detector, or the operator can not judge quickly by himself.

BRIEF DESCRIPTION OF THE DRAWINGS

The present disclosure can be further illustrated by the non restrictive embodiments given in the drawings.

DETAILED DESCRIPTION

Figure 1:
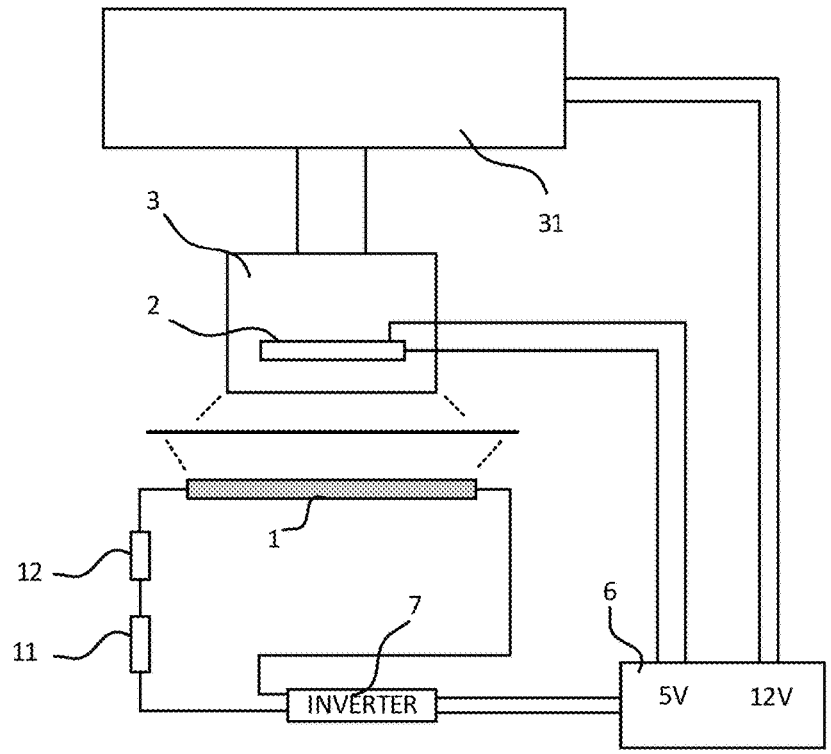
FIG. 1 is an isometric view of a system of the present disclosure.

The object of the present disclosure is to provide a method and system for detecting currency, capable of automatic banknote checking and manual banknote checking, and with fewer sensors, the cost is reduced, the occurrence of faults is reduced, and the maintenance is convenient. The accuracy of banknote judgement is improved.

In order to achieve the above technical purposes, the technical proposal adopted by the present disclosure is as follows:

A system for detecting currency includes a UV light source; a white light source and the UV light source faced to each other, and a currency detecting channel formed between the white light source and the UV light source; an image acquiring device and white light source located a same side of the currency detecting channel, the image acquiring device outputting a currency image to a display device; wherein a micro-switch is located on a controlling loop of the UV light source, and a trigger of the micro-switch is located in the currency detecting channel; wherein a pause switch is located on a controlling loop of the UV light source, and the pause switch and the micro-switch are in series connection.

The present disclosure is realized in this way: when detecting currency, a currency is entered the currency detecting channel, the micro-switch is triggered, the UV light source is turned on, the white light source is in the normal state; the UV light source fluoroscopy the currency; then the image acquiring device takes a currency image, and outputs the currency image to the display screen. The operator can observe the currency in real time, and then manually or the controller controls the pause switch to turn off the UV light source. The image acquiring device outputs the currency image to the display screen when the UV light source is turned off. The operator makes a second observation and completes a currency detecting.

The further limit is that: the pause switch is a manual switch or an electrically controlled switch. The UV light source is turned off by manually and automatically controlled through the controller.

The further limit is that: the image acquiring device includes a micro-conex lens.

The further limit is that: the display device is a display screen for operator observed convenient.

The further limit is that: the system further includes a controller, the controller is electronic connected to the image acquiring device, and the controller is electronic connected to the pause switch to realize automatic currency detecting. The controller automatically controls the pause switch and receives data of the currency from the image acquiring device for judgment, and then prompts an output.

The further limit is that: the system further includes a prompting device. The prompting device includes one or more visual prompts, sound prompts, and vibration prompts to adapt to the needs of different groups of people, adaptability is wider.

A method for detecting currency includes: acquiring image, a UV light source and a white light source turned on, an image acquiring device acquiring a currency image under a fluoroscopy by the UV light source; displaying, the image acquiring device outputting the currency image to the display device to be displayed The operator can observe the currency image of the display device to identify the authenticity.

The further limit is that: the method further includes automatic output, wherein the image acquiring device also outputs the currency image to a controller; the controller includes a standard image, the controller compares and judges the currency image with the standard image and outputs.

The further limit is that: the method further includes when the UV light source is turned off and the white light source is turned on, acquire another image, display, and automatic output.

The present disclosure adopts the above-mentioned technical scheme, which can judge whether a font and the color light in safety line are on a surface of the currency or inside of the currency by acquiring and observing the currency image or automatically judging by the controller when the UV light source is turned on and off, so as to improve the accuracy rate of judging the authenticity of the currency. Automatic judgment combined with manual judgment, even if the automatic judgment problems, manual judgment can continue to verify the authenticity.

Compared with the prior art, the present disclosure uses fewer sensors and improves the reliability. The combination of the UV light source and the white light source makes the currency image clearer and the judgment structure more accurate when the currency image is taken. At the same time, the two states of the opening and closing of the UV light source are adopted. By contrast, the font and color light in the safety line are judged to determine whether it is inside or on the surface of the currency, which improves the accuracy of the currency.

In order to make the object, technical scheme and advantages of the present disclosure more clearly, the present disclosure is further described in detail in connection with the following embodiments. It should be understood that the specific embodiments described herein are intended only to explain the present disclosure and are not intended to limit it.

FIG. 1 illustrates a system for detecting currency. The system for detecting currency includes a UV light source 1, a white light source 2, an image acquiring device 3, a controller, and a prompting device. The white light source 2 and the UV light source 1 are faced to each other. A currency detecting channel is formed between the white light source 2 and the UV light source 1.

A micro-switch 11 is located on a controlling loop of the UV light source 1. A trigger of the micro-switch 11 is located in the currency detecting channel.

A pause switch 12 is located on a controlling loop of the UV light source 1. The pause switch 12 and the micro-switch 11 are in series connection. The pause switch 12 is a manual switch or an electrically controlled switch. The UV light source 1 is turned off by manually and automatically controlled through the controller.

The image acquiring device 3 and the white light source 2 are located at a same side of the currency detecting channel. The image acquiring device 3 outputs a currency image to a display device 31. The image acquiring device 3 includes a micro-convex lens. The display device 31 is a display screen.

The controller is electronic connected to the image acquiring device 3, and the controller is electronic connected to the pause switch 12 to realize automatic currency detecting. The controller automatically controls the pause switch 12 and receives data of the currency from the image acquiring device 3 for judgment, and then prompts an output.

The prompting device includes one or more visual prompts, sound prompts, and vibration prompts.

When detecting currency, a currency is entered the currency detecting channel, the micro-switch 11 is triggered, the UV light source 1 is turned on, the white light source 2 is in the normal state; the UV light source 1 fluoroscopy the currency; then the image acquiring device 3 takes a currency image, and outputs the currency image to the display screen. The operator can observe the currency in real time, and then manually or the controller controls the pause switch 12 to turn off the UV light source 1. The image acquiring device 3 outputs the currency image to the display screen when the UV light source 1 is turned off. The operator makes a second observation and completes a currency detecting.

As shown in FIG. 1, the white light source 2, the UV light source 1, and the display device 31 use a voltage regulator 6, and the UV light source 1 is configured with a frequency converter 7.

Figure 2:
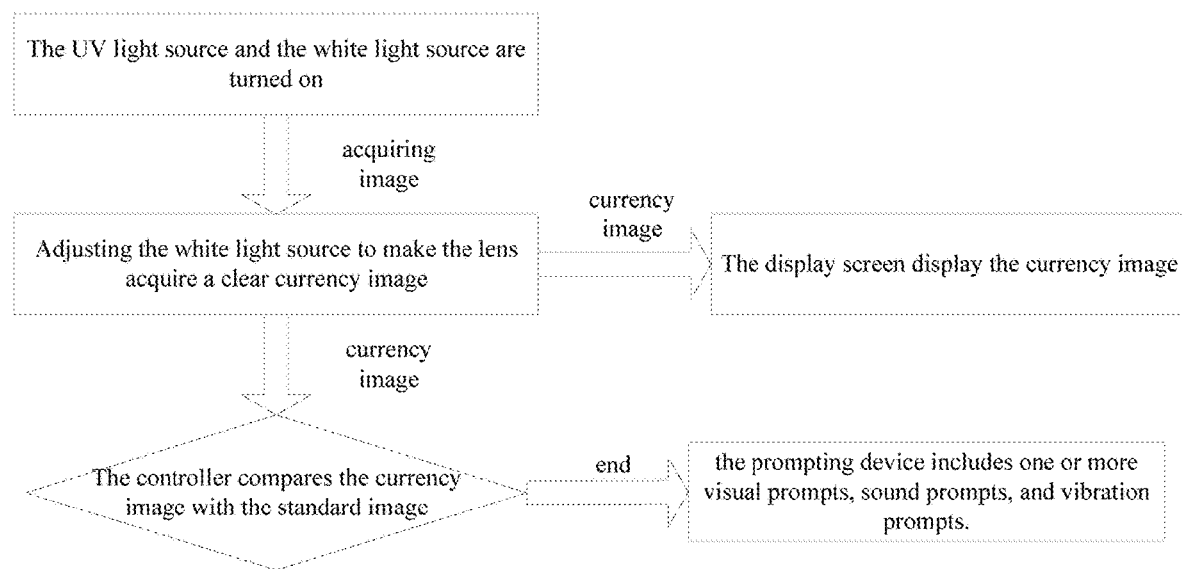
FIG. 2 is a flow chart of a method of the present disclosure.

FIG. 2 illustrates a method for detecting currency including following steps:

acquiring image, the UV light source 1 and the white light source 2 are turned on, the image acquiring device 3 acquires a currency image under a fluoroscopy by the UV light source 1;

displaying, the image acquiring device 3 outputs the currency image to the display device 3 to be displayed;

automatic output, the image acquiring device 3 also outputs the currency image to the controller; the controller includes a standard image, the controller compares and judges the currency image with the standard image and outputs;

when the UV light source 1 is turned off and the white light source 2 is turned on, acquire another image, display, and automatic output in a similar method.

When the UV light source 1 is turned on and the UV light source 1 is turned off, the output prompts are different. For example, when the UV light source 1 is turned on, the prompts for real currencies are green, the counterfeit currencies are red. When the UV light source 1 is turned off, the prompts for real currencies are purple and the counterfeit currencies are yellow. In both cases, one is prompted by sound and the other by color, which ensures the accuracy of the currency detecting.

The present disclosure adopts the above-mentioned technical scheme, which can judge whether a font and the color light in safety line are on a surface of the currency or inside of the currency by acquiring and observing the currency image or automatically judging by the controller when the UV light source 1 is turned on and off, so as to improve the accuracy rate of judging the authenticity of the currency. Automatic judgment combined with manual judgment, even if the automatic judgment problems, manual judgment can continue to verify the authenticity.

Compared with the prior art, the present disclosure uses fewer sensors and improves the reliability. The combination of the UV light source 1 and the white light source 2 makes the currency image clearer and the judgment structure more accurate when the currency image is taken. At the same time, the two states of the opening and closing of the UV light source 1 are adopted. By contrast, the font and color light in the safety line are judged to determine whether it is inside or on the surface of the currency, which improves the accuracy of the currency.

The method and system for detecting currency provided in the present disclosure are introduced in detail. The instructions for specific embodiments are only used to help understand the method and the core idea of the present disclosure. It should be pointed out that, for those of ordinary skill in the art, without departing from the principles of the present disclosure, the present disclosure can also be improved and modified in a number of ways, which fall within the scope of the protection of the claims of the present disclosure.

I claim:

1. A system for detecting currency, comprising:
a UV light source;
a white light source and the UV light source faced to each other, and a currency detecting channel formed between the white light source and the UV light source;
an image acquiring device and white light source located a same side of the currency detecting channel, the image acquiring device outputting a currency image to a display device;
wherein a micro-switch is located on a controlling loop of the UV light source; when a currency enters the currency detecting channel, the micro-switch is triggered to turn on the UV light source and turn on the white light source;
wherein a pause switch is located on a controlling loop of the UV light source, and the pause switch and the micro-switch are in series connection.

2. The system for detecting currency of claim 1, wherein the pause switch is a manual switch or an electrically controlled switch.

3. The system for detecting currency of claim 1, wherein the display device is a display screen.

4. The system for detecting currency of claim 1, further comprising a controller, wherein the controller is electronic connected to the image acquiring device, and the controller is electrically connected to the pause switch.

5. The system for detecting currency of claim 4, further comprising a prompting device, wherein the prompting device comprises one or more visual prompts, sound prompts, and vibration prompts.

6. A method for detecting currency, comprising:

acquiring image, a UV light source and a white light source turned on by that a micro-switch is triggered while a currency enters the currency detecting channel, an image acquiring device acquiring a currency image under a fluoroscopy by the UV light source; the controlling loop of the UV light source comprises the micro-switch and a pause switch, and the micro-switch is connected in series with the pause switch;

displaying, the image acquiring device outputting the currency image to the display device to be displayed.

7. The method for detecting currency of claim 6, further comprising automatic outputting, wherein the image acquiring device also outputs the currency image to a controller; the controller includes a standard image, the controller compares and judges the currency image with the standard image and outputs.

8. The method for detecting currency of claim 6, wherein comprising:

turning off the UV light source and turning on the while light source;

acquiring another image, displaying, and automatic outputting.

* * * * *